ns Patent Office
3,245,659
Patented Apr. 12, 1966

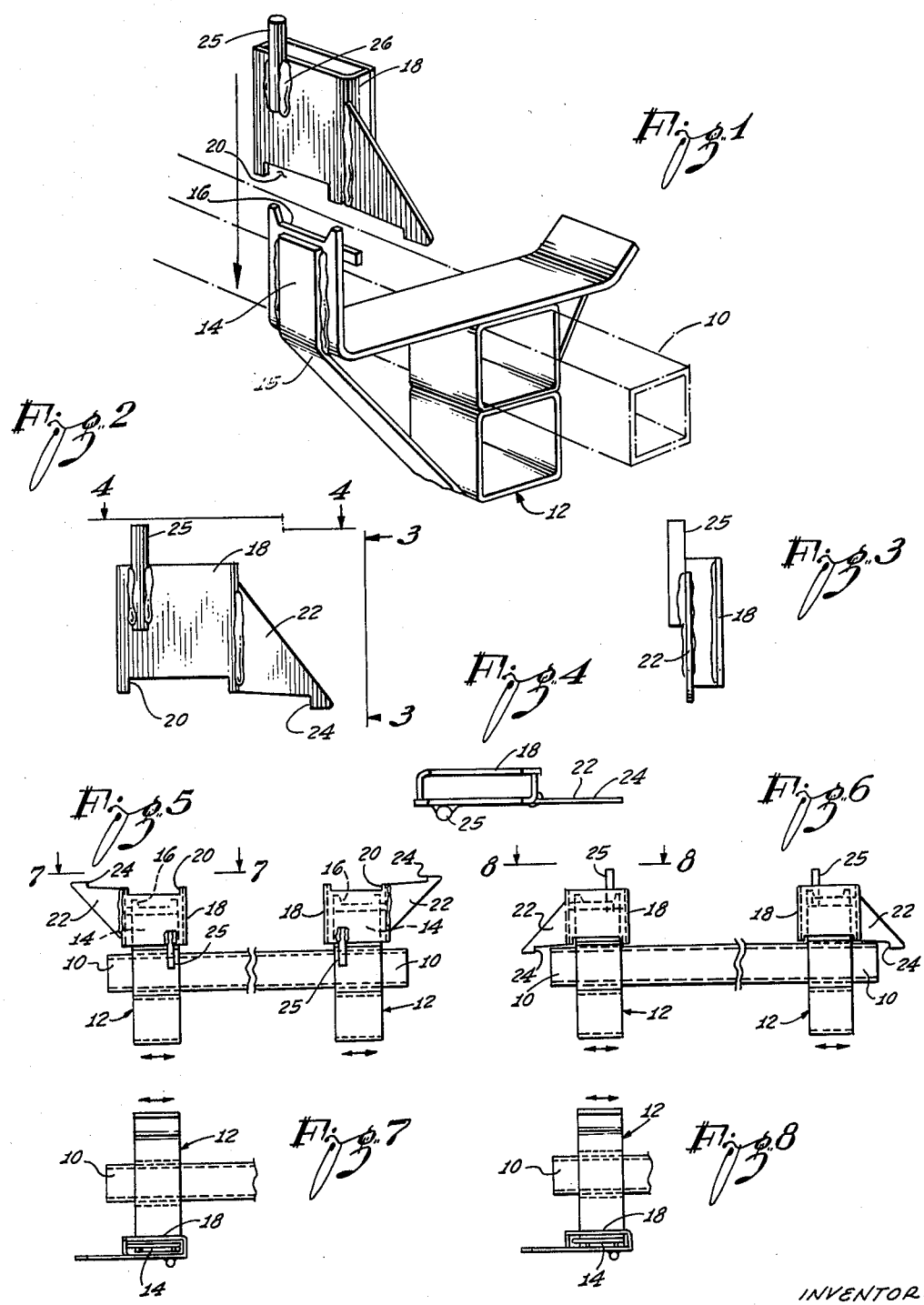

3,245,659
ADAPTER FOR FLUID-OPERATED JACK
John L. Nolden, 630 Resolano Drive,
Pacific Palisades, Calif.
Filed Dec. 14, 1962, Ser. No. 244,681
3 Claims. (Cl. 254—134)

This invention relates to adapter means for increasing the range of usefulness of a portable industrial jack that is employed to service and repair automotive vehicles. The invention is specifically directed to such adapted means for a portable fluid-operated jack of the construction disclosed in the Nolden Patent No. 3,044,747.

A fluid-actuated portable jack of the type commonly employed in garages and service stations has a pair of laterally spaced members to engage an automotive vehicle for the purpose of lifting the vehicle. In some instances the engagement is made with a bumper of the vehicle at widely spaced points thereof and in other instances the jack engages two laterally spaced support arms that mount the bumper on the vehicle chassis.

For example, the jack disclosed in the above patent has a pair of brackets or "saddles" adjustably spaced on opposite lateral arms, which brackets may be used either to engage a bumper of an automotive vehicle or to engage spaced arms that support the bumper. For the latter purpose, each of the two brackets may be positioned to present an upright tongue which has a notch in its upper edge of a width to seat one of the two vehicle arms that supports the vehicle bumper.

A difficulty arises because each year automobile manufacturers bring out numerous different new models and a particular jack purchased during one year is not adapted for lifting engagement with some of the more radically different models brought out the next year. Thus a portable jack of universal usefulness in one year is of only limited usefulness in a later year so that ordinarily the purchase of an additional jack is necessary to handle all of the new cars of the later year.

In one particular year, for example, three different variations in automobile constructions were outside the scope of application of the above-mentioned portable jack. One variation is that each of the spaced bumper-supporting arms on some new models is of greater thickness than ever before with the result that the arms will not seat securely and safely in the above-mentioned notches in the upper ends of the tongues of the two brackets on the jack. Another model provides two spaced apertures on the underside of the vehicle bumper for engagement by a jack but the above-mentioned jack has no elements dimensioned to engage these apertures. Another new model has bumper-supporting arms that are spaced apart laterally by a distance beyond the reach of the two brackets on the above-mentioned jack.

The present invention meets these difficulties by providing a pair of adapters to be removably mounted on the lifting brackets or saddles of the above-mentioned jack to restore to universal usefulness a jack that would otherwise be incapable of lifting some of the new models of automobiles. The present embodiment of the invention, for example, adapts the above-mentioned jack to all three of the above variations in the models of new automobiles.

Each adapter of the invention is in the form of a metal sleeve of rectangular cross section which removably telescopes over the previously mentioned upwardly extending notched tongue of the jack. The sleeve is longer than the tongue to extend above the tongue and one end of the sleeve is formed with a notch that is substantially wider than the existing notch of the tongue to seat a thickened bumper-supporting arm of a new model of automobile. With the two adapter sleeves positioned on the two tongues of the jack with the notched ends of the sleeves uppermost, the notched ends of the sleeves may be used to engage and seat the thicker bumper-supporting arms that cannot be accommodated by the notches in the upper ends of the tongues themselves.

The other end of the adapter sleeve of the invention is provided with a finger that is dimensioned to enter a previously mentioned aperture on the underside of a bumper of a new car. With the two adapters mounted on the two tongues of the jacks with the fingers of the adapters extending upward, the adapter fingers may be used to engage the bottom apertures of the bumper of the new model automobile.

In the present embodiment of the invention each of the two adapter sleeves is further formed with a laterally extending wing with a stop shoulder on the outer end of the wing. With the two adapter sleeves mounted on the two upright tongues of the jack and with the adapter wings extending laterally outwardly from the adapter sleeves in opposite directions, the two wings, in effect, increase the lateral reach of the jack and thus enable the jack to engage the bumper-supporting arms of the new model of automobile that are spaced substantially further apart than the bumper-supporting arms for which the jack was originally designed.

The features and advantages of the invention may be understood from the following detailed description together with the accompanying drawing.

In the drawing, which is to be regarded as merely illustrative:

FIG. 1 is an exploded perspective view showing one of the lateral square tubular arms of the jack together with a bracket or saddle for adjustably mounting on the arm and an adapter for mounting on the upright notched tongue of the bracket, the adapter sleeve being shown with its finger positioned uppermost;

FIG. 2 is a side elevational view of the adapter with the finger uppermost;

FIG. 3 is an edgewise elevational view of the adapter as seen along the line 3—3 of FIG. 2;

FIG. 4 is an end view of the adapter as seen along the line 4—4 of FIG. 2;

FIG. 5 shows a pair of adapters of the invention comprising a left-hand adapter and a right-hand adapter mounted on the upright tongues of right-hand and left-hand brackets respectively of the fluid-actuated jack, with the notched ends of the adapters uppermost;

FIG. 6 is a similar view with the two adapters reversed to place their fingers uppermost;

FIG. 7 is a plan view of a saddle or bracket with an adapter thereon, as seen along the line 7—7 of FIG. 5; and FIG. 8 is a plan view as seen along the line 8—8 of FIG. 6, the position of the adapter being reversed.

As shown in FIGS. 1, 5 and 6, the jack disclosed in the above-mentioned patent has a suitably supported transverse bar of square tubular cross section which forms two opposite laterally extending lift arms 10 on which brackets or saddles 12 are slideably mounted for adjustment in spacing. As best shown in FIG. 1, each of the brackets 12 is formed with an upwardly extending tongue 14 which is reinforced by a diagonal brace bar 15 and which is formed with a relatively wide notch 16 in its upper end. The two notches 16 of the two brackets 12 are dimensioned to seat and safely engage the bumper-supporting arms of most of the existing models of automobiles but are not wide enough to seat safely an exceptionally thick bumper-supporting arm of some of the new models.

Each of the two adapters for mounting on the two tongues 14 respectively, comprises a metal sleeve 18 of rectangular cross section dimensioned to freely telescope over an upstanding tongue 14 of a bracket 12 of the jack. Such a sleeve 18 may be made of metal approximately one-eight inch thick and may be of welded construction.

The two opposite walls of the metal sleeve 18 are cut away at one end of the sleeve to provide a notch 20 that is substantially wider than the previously mentioned notch 16 of a bracket tongue 14. The metal sleeve 18 is sufficiently longer than the tongue 14 of the jack bracket to place the notch 20 of the sleeve above the notch 16 of the bracket tongue 14 when the adapter is mounted on the bracket in the manner shown in FIG. 5. Thus the two metal sleeves 18 may be mounted on the two tongues 14 of the jack in the manner indicated in FIG. 5 to permit the wider notches 20 of the metal sleeves to seat and safely engage the undersides of the thicker bumper-supporting arms of new model cars.

Each of the two metal sleeves 18 is provided with a lateral wing 22 that is formed with an upwardly extending stop shoulder 24 at its outer end.

Preferably, as may be seen in FIG. 4, the lateral wing 22 of a metal sleeve 18 is substantially in alignment with one of the side walls of the sleeve and it is desirable to provide left-hand adapter sleeves and right-hand adapter sleeves so that when a pair of the adapter sleeves are employed in a manner shown in FIG. 5, the two lateral wings 22 will be aligned in the same vertical plane. With the two lateral wings 22 extending oppositely outward as shown in FIG. 5, it is apparent that the two wings extend the lateral reach of the jack since the upper edges of the two wings may make lifting engagement with bumper-supporting arms that are spaced too far apart for engagement by the brackets 12.

Each of the metal adapter sleeves 18 is further provided with an upstanding finger 25 dimensioned to enter a previously mentioned aperture in the underside of a bumper of a new car. In the construction shown, the finger 25 is in the form of a short piece of bar stock that is attached to the metal sleeve 18 by welding 26. With the two adapted sleeves mounted on the two brackets 12 with the fingers 25 of the adapter sleeves pointing upward as shown in FIG. 6, the fingers may be adjusted in spacing for simultaneous engagement with the bottom apertures of a new model automobile.

From the foregoing, it is apparent that merely providing the two adapter sleeves for the portable jack makes the jack universal in the sense of being adaptable to all makes of cars. Thus if a new model car has relatively thick bumper-supporting arms, the two brackets may be used in the position shown in FIG. 7 with their wide notches 20 uppermost to seat the thick support arms. If the bumper-supporting arms of an automobile are spaced too far apart for direct engagement by the spaced brackets 12 of the jack, the adapters may be employed in the same positions as shown in FIG. 5 with the two wings 22 extending outwardly in opposite directions sufficiently to make lift engagement with the widely spaced bumper support arms of the new model. If a new model car has spaced apertures in the underside of each of its two bumpers, the two adapter sleeves may be positioned on the upright tongues of the two brackets in the manner shown in FIG. 6 to permit the two upstanding fingers 25 of the adapter sleeves to fit into the bottom apertures of the bumpers.

My description in specific detail of the presently preferred embodiment of the invention will suggest various changes, substitutions and other departures from my disclosure within the spirit and scope of the appended claims. As each year brings forth new models of automobiles, the adapter may be modified as necessary to provide the desired universal usefulness for the jack.

I claim:

1. An adapter to increase the number of models of vehicles that may be lifted by a jack, wherein the jack has a bracket with an upstanding tongue with a notch in the upper end of the tongue of a width to receive a bumper-supporting arm of a given vehicle, said adapter comprising a sleeve to rest on said bracket in position telescoped over the tongue, said sleeve being longer than the tongue and having a notch in its upper end wider than the notch of the tongue to receive a thicker bumper-supporting arm of one new model vehicle, said sleeve having a downwardly pointed finger on its lower end to fit an aperture on the underside of a second new model vehicle whereby the sleeve may be reversed end for end on said tongue to engage the bumper of the second new model vehicle.

2. An adapter as set forth in claim 1 in which said sleeve has a laterally extending wing to extend the effectiveness of the sleeve laterally from the tongue.

3. A pair of adapters to increase the number of models of vehicles that may be lifted by a jack, wherein the jack has an elongated longitudinally extending lift arm and a pair of brackets with upstanding tongues adjustable a given maximum distance apart along said lift arm for lift engagement with a vehicle, said adapters comprising a pair of sleeves to rest on the brackets respectively in positions telescoped over the tongues of the brackets, each sleeve having a laterally outwardly extending wing with an upwardly extending shoulder on the other end thereof, said wings extending in opposite longitudinal directions from each other and generally parallel to the longitudinal direction of said lift arms, whereby the wings may make lift engagement with the bumper-supporting arms of new models of automobiles that are spaced too far apart for engagement by said brackets of the jack.

References Cited by the Examiner

UNITED STATES PATENTS

| | | | |
|---|---|---|---|
| 2,556,006 | 6/1951 | Slack | 254—133 |
| 2,630,297 | 3/1953 | Hunz | 254—133 |
| 2,895,712 | 7/1959 | Stovern et al. | 254—134 |
| 2,947,513 | 8/1960 | Nolden et al. | 254—134 |
| 3,091,431 | 5/1963 | Arnes et al. | 254—2.4 |
| 3,130,956 | 4/1964 | Mandelko | 254—2.4 |

FOREIGN PATENTS 751,787   7/1956   Great Britain.

EDWARD C. ALLEN, *Primary Examiner.*

MILTON S. MEHR, WILLIAM FELDMAN, *Examiners.*

O. M. SIMPSON, *Assistant Examiner.*